(12) United States Patent
Wanakule et al.

(10) Patent No.: US 11,401,206 B2
(45) Date of Patent: Aug. 2, 2022

(54) SUBSTRATE PROVIDED WITH A STACK HAVING THERMAL PROPERTIES

(71) Applicant: SAINT-GOBAIN GLASS FRANCE, Courbevoie (FR)

(72) Inventors: Nissita Wanakule, Paris (FR); Veronique Rondeau, Asniere sur Seine (FR); Tommaso Ongarello, Le Plessis Robinson (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/652,298

(22) PCT Filed: Oct. 24, 2018

(86) PCT No.: PCT/FR2018/052641
§ 371 (c)(1),
(2) Date: Mar. 30, 2020

(87) PCT Pub. No.: WO2019/086784
PCT Pub. Date: May 9, 2019

(65) Prior Publication Data
US 2020/0239359 A1 Jul. 30, 2020

(30) Foreign Application Priority Data
Oct. 30, 2017 (FR) .................................... 17 60237

(51) Int. Cl.
*C03C 17/36* (2006.01)

(52) U.S. Cl.
CPC ........ *C03C 17/3618* (2013.01); *C03C 17/366* (2013.01); *C03C 17/3626* (2013.01);
(Continued)

(58) Field of Classification Search
CPC ............ C03C 17/3639; C03C 17/3644; C03C 17/366; C03C 17/3681
See application file for complete search history.

(56) References Cited

U.S. PATENT DOCUMENTS

2007/0020465 A1 * 1/2007 Thiel ....................... C03C 17/36
428/428
2007/0275253 A1 * 11/2007 Thiel ................... C03C 17/3639
428/432
(Continued)

FOREIGN PATENT DOCUMENTS

| WO | WO 2011/147875 A1 | 12/2011 | |
| WO | WO 2017/006030 A1 | 1/2017 | |
| WO | WO-2018131863 A1 * | 7/2018 | ......... C03C 17/3644 |

OTHER PUBLICATIONS

International Search Report dated Feb. 11, 2019 in PCT/FR2018/052641 filed on Oct. 24, 2018, 2 pages.

*Primary Examiner* — Z. Jim Yang
(74) *Attorney, Agent, or Firm* — Oblon, McClelland, Maier & Neustadt, L.L.P.

(57) ABSTRACT

A material includes a transparent substrate coated on one face with a stack of thin layers successively including, starting from the face, an alternation of three silver-based functional metal layers denoted, starting from the substrate, first, second and third functional layers respectively Ag1, Ag2 and Ag3, and of four dielectric coatings denoted, starting from the substrate, M1, M2, M3 and M4, with optical thicknesses respectively To1, To2, To3 and To4. Each functional metal layer is positioned between two dielectric coatings. The geometrical thickness of the second functional layer Ag2 is less than the thickness of the first functional layer Ag1. The geometrical thickness of the second functional layer Ag2 is less than the thickness of the third functional layer Ag3. The dielectric coating M2 exhibits a (Continued)

lower optical thickness To2 than the optical thicknesses To1, To3 and To4 respectively of the dielectric coatings M1, M3 and M4.

20 Claims, 1 Drawing Sheet

(52) U.S. Cl.
CPC ...... *C03C 17/3644* (2013.01); *C03C 17/3649* (2013.01); *C03C 17/3681* (2013.01); *C03C 2218/155* (2013.01); *C03C 2218/156* (2013.01)

(56) References Cited

U.S. PATENT DOCUMENTS

| | | | |
|---|---|---|---|
| 2009/0297864 A1 | 12/2009 | Lingle et al. | |
| 2010/0187990 A1 | 7/2010 | Lingle et al. | |
| 2011/0169402 A1 | 7/2011 | Lingle et al. | |
| 2011/0236715 A1* | 9/2011 | Polcyn | C03C 17/36 428/209 |
| 2012/0087005 A1* | 4/2012 | Reymond | C03C 17/3626 359/360 |
| 2012/0219821 A1* | 8/2012 | Frank | C03C 17/3652 156/60 |
| 2013/0057951 A1* | 3/2013 | Hevesi | C03C 17/36 359/359 |
| 2013/0059137 A1* | 3/2013 | Hevesi | G02B 5/208 428/213 |
| 2014/0237917 A1* | 8/2014 | Theios | E06B 9/24 52/203 |
| 2014/0347722 A1* | 11/2014 | Hevesi | C03C 17/3681 359/359 |
| 2015/0140354 A1* | 5/2015 | Pallotta | C03C 17/3626 428/428 |
| 2016/0023942 A1* | 1/2016 | Mahieu | C03C 17/3681 428/433 |
| 2016/0031751 A1* | 2/2016 | Mahieu | C03C 17/3642 428/428 |
| 2016/0122237 A1* | 5/2016 | Mahieu | C03C 17/3644 359/359 |
| 2016/0124119 A1* | 5/2016 | Georges | C03C 17/3644 359/585 |
| 2016/0223729 A1* | 8/2016 | Medwick | C03C 17/3639 |
| 2016/0257611 A1* | 9/2016 | Noethe | C03C 17/3435 |
| 2018/0148372 A1* | 5/2018 | Bellman | C03C 17/3639 |
| 2018/0194675 A1* | 7/2018 | Lorenzzi | C03C 17/3642 |
| 2018/0194677 A1* | 7/2018 | Lorenzzi | C03C 17/3639 |
| 2018/0251886 A1* | 9/2018 | Lu | C23C 14/18 |
| 2019/0064516 A1* | 2/2019 | Wagner | B32B 17/10036 |
| 2019/0185374 A1* | 6/2019 | Kwon | C03C 17/3681 |
| 2019/0242178 A1* | 8/2019 | Fisher | C03C 17/3644 |
| 2019/0377115 A1* | 12/2019 | Boyce | G02B 5/282 |
| 2020/0079686 A1* | 3/2020 | Xu | B32B 17/06 |
| 2021/0107258 A1* | 4/2021 | Horie | B32B 17/10201 |

* cited by examiner

SUBSTRATE PROVIDED WITH A STACK HAVING THERMAL PROPERTIES

The invention relates to a material, such as a glazing, comprising a transparent substrate coated with a stack of thin layers comprising several functional layers which can influence solar radiation and/or infrared radiation. The invention also relates to the glazings comprising these materials and also to the use of such materials for manufacturing thermal insulation and/or solar protection glazings.

These glazings may be intended to equip both buildings and vehicles, in particular with a view to reducing the air-conditioning load and/or preventing excessive overheating, which glazings are known as "solar control" glazings, and/or reducing the amount of energy dissipated toward the outside, which glazings are known as "low-e" glazings, driven by the ever-increasing importance of glazed surfaces in buildings and vehicle passenger compartments.

Depending on the climates of the countries where these glazings are installed, the desired performance qualities in terms of light transmission and of solar factor can vary within a certain range. The light transmission has to be sufficiently low to eliminate dazzle and sufficiently high for the decrease in the amount of light penetrating inside the space delimited by said glazing not to make it necessary to use artificial light. For example, in countries where the levels of exposure to sunlight are high, there exists a strong demand for glazings exhibiting a light transmission of the order of or greater than 50% and preferably as high as possible, for low solar factor values, typically of less than or equal to 30%, that is to say the selectivity of which is of the order of 2 or slightly less.

Glazings comprising transparent substrates coated with a stack of thin layers comprising three functional metal layers, each positioned between two dielectric coatings, have been provided in order to improve solar protection while retaining a sufficient light transmission. These stacks are generally obtained by a sequence of depositions carried out by cathode sputtering, optionally assisted by a magnetic field. These glazings are described as selective as they make it possible:
- to reduce the amount of solar energy penetrating inside the buildings while exhibiting a low solar factor (SF or g),
- to guarantee a sufficient light transmission,
- to exhibit a low emissivity in order to reduce the loss of heat by long-wavelength infrared radiation.

According to the invention:
- solar factor "g" is understood to mean the ratio, as percentage, of the total energy entering the premises through the glazing to the incident solar energy,
- selectivity "s" is understood to mean the ratio of the light transmission to the solar factor $T_L/g$.

The materials of the prior art make it possible to obtain light transmission, solar factor and emissivity values within the desired ranges. However, the esthetic appearance and the properties in reflection of such glazings are not entirely satisfactory and exhibit in particular the following disadvantages:
- non-neutral colors in external reflection or a pronounced coloration in undesired hues, and
- excessively low levels of external reflection.

Finally, there currently exists a strong demand for glazings exhibiting a shiny silver appearance in external reflection. Such an appearance is obtained by maximizing the external light reflection ($R_{Lext.}$) of the glazing.

The materials currently on the market which make it possible to obtain this shiny silver appearance in reflection on the external side comprise:
- substrates coated with stacks deposited by the chemical route (CVD),
- substrates coated with stacks deposited by cathode sputtering comprising functional layers which are not based on silver but, for example, based on niobium.

These materials do not make it possible to obtain the desired optical and energy performance qualities. This is because these materials do not simultaneously exhibit a low solar factor (SF or g), a sufficient light transmission and a high selectivity.

The objective of the invention is to develop a material simultaneously exhibiting a shiny silver appearance and the solar control properties desired in the field. According to the invention, the aim is thus to minimize the solar factor, while retaining a light transmission suited to making possible good insulation and good viewing, in particular of greater than 50%, so to obtain a selectivity of approximately 2, it being understood that the external shiny silver appearance furthermore supposes a sufficiently high external light reflection, that is to say of at least 25%, and a relatively neutral coloration of the glazing in reflection or alternatively a slight blue coloration. According to a secondary aspect of the present invention, it is also desired to obtain a glazing, the color in transmission of which (important for viewing from the inside toward the outside of the building) is as neutral as possible or alternatively exhibits a slight blue coloration.

The complexity of the stacks comprising three functional layers makes difficult the combined improvement in these properties of reflection and of transmission of visible light without harming the solar control performance qualities.

There thus exists a need to develop a material for use in a glazing which makes it possible:
- to minimize the solar factor,
- to obtain, in reflection, a shiny silver appearance in order to render the glazing attractive,
- to increase the reflection on the external side in order in particular to retain privacy (privacy effect),
- to guarantee a light transmission which is as high as possible, in order to guarantee good viewing through the material,
- if possible, and additionally, to obtain a neutral coloration in transmission of the material or of the glazing incorporating the material.

A similar technical problem has already been touched on in the international patent application of patent No. WO2017/006030 A1. A description is given therein of a stack comprising three functional layers made of silver, exhibiting an external light reflection of 30% for a light transmission of 50%, the selectivity being of the order of 2. According to the teaching of this publication, each dielectric coating comprises at least one high-index dielectric layer, the refractive index of which is at least 2.15 and the optical thickness of which is greater than 20 nm. This publication shows examples with the thickness of the first functional layer which is less than the thickness of the second and third functional layers. However, this value of the light transmission appears to be a target and limit value obtained for the configurations described but no information is provided in this publication with regard to the possibility of further increasing the value of the light transmission and the modifications to be made in order to arrive thereat.

International patent application No. WO2011/147875 for its part describes stacks comprising three functional layers made of silver in which the second functional layer exhibits a physical (geometrical) thickness which is lower than that of the other functional layers. However, this patent application does not describe glazings exhibiting a high external reflection suitable for obtaining the glazings desired according to the invention exhibiting a shiny silver appearance in external reflection, as explained above.

The applicant company has discovered, surprisingly, that, by selecting the thicknesses of the three functional layers, combined with a specific choice of the thicknesses of the dielectric coatings, it is possible to obtain a material liable to exhibit the desired properties. A shiny silver appearance and a high reflection on the external side can in particular be obtained, and also a light transmission substantially greater than 50%, while retaining the thermal insulation properties, in particular a selectivity of slightly less than 2.

The solution of the invention thus exhibits an excellent compromise between the optical and thermal performance qualities, the transparency and the esthetic appearance.

A subject matter of the invention is first a material as claimed in claim 1. This material comprises a transparent substrate coated on one face with a stack of thin layers successively comprising, starting from said face, an alternation of three silver-based functional metal layers denoted, starting from the substrate, first, second and third functional layers respectively Ag1, Ag2 and Ag3, and of four dielectric coatings denoted, starting from the substrate, M1, M2, M3 and M4, with optical thicknesses respectively To1, To2, To3 and To4, each dielectric coating comprising a dielectric layer or a dielectric assembly of layers, so that each functional metal layer is positioned between two dielectric coatings, said material being noteworthy in that:
  the geometrical thickness of the second functional layer Ag2 is less than the thickness of the first functional layer Ag1,
  the geometrical thickness of the second functional layer Ag2 is less than the thickness of the third functional layer Ag3,
  the dielectric coating M2 exhibits a lower optical thickness To2 than the optical thicknesses To1, To3 and To4 respectively of the dielectric coatings M1, M3 and M4.

By thus adjusting the thicknesses of the three functional layers and of the dielectric coatings of the stack, the transparency of the glazing can be controlled so as to obtain low light transmission $T_L$ values, substantially greater than 50.0% (of between 50.0% and 57.0%, preferably simultaneously greater than 50.0% and less than 57.0%), a range very particularly suitable for glazings intended to be used in regions exposed to strong sunlight. According to a major advantage of the invention, the satisfactory visual appearance with in particular specific colors in external reflection and also external reflection values which are sufficiently high is not obtained to the detriment of the solar protection performance qualities.

Said stack of thin layers can successively comprise, starting from said face of the substrate, an alternation of:
  only three silver-based functional metal layers denoted, starting from the substrate, first, second and third functional layers respectively Ag1, Ag2 and Ag3,
  and of only four dielectric coatings denoted, starting from the substrate, M1, M2, M3 and M4, with optical thicknesses respectively To1, To2, To3 and To4, each dielectric coating comprising a dielectric layer or a dielectric assembly of layers, so that each functional metal layer is positioned between two dielectric coatings.

The preferred characteristics which appear in the continuation of the description are applicable both to the process according to the invention and, if appropriate, to the products, that is to say to the materials or to the glazings comprising the material.

Some preferred but nonlimiting embodiments of the present invention are given below:
  The dielectric coating M2 exhibits an optical thickness To2 of between 40 and 90 nm, preferably of between 50 and 70 nm.
  The geometrical thickness of the second functional layer Ag2 is between 2 and 10 nanometers, preferably between 5 and 10 nanometers, indeed even between 5 and 8 nanometers.
  The geometrical thickness of the first functional layer Ag1 is between 8 and 20 nanometers, preferably between 10 and 18 nanometers, indeed even between 10 and 16 nanometers.
  The geometrical thickness of the third functional layer Ag3 is between 8 and 20 nanometers, preferably between 10 and 18 nanometers, indeed even between 12 and 15 nanometers.
  The cumulative geometrical thickness of the functional layers Ag1, Ag2 and Ag3 is between 25 and 50 nanometers, preferably is between 30 and 40 nanometers.
  The dielectric coating M3 exhibits a greater optical thickness To3 than the optical thicknesses To1 and To4 respectively of the dielectric coatings M1 and M4.
  The optical thicknesses of the dielectric coatings are such that:
  To2<To4<To1<To3.
  The optical thicknesses To3 and To2 respectively of the dielectric coatings M3 and M2 are such that To3>1.5 To2, preferably such that To3>2 To2 and very preferably in that To3>2.5 To2.
  The optical thicknesses To3 and To4 respectively of the dielectric coatings M3 and M4 are such that To3>1.5 To4 and preferably such that To3>2 To4.
  The optical thicknesses To3 and To1 respectively of the dielectric coatings M3 and M1 are such that To3>1.5 To1.
  The optical thickness To1 of the dielectric coating M1 is between 75 and 120 nm; preferably, To1 is between 80 and 100 nm.
  The optical thickness To2 of the dielectric coating M2 is between 50 and 70 nm.
  The optical thickness To3 of the dielectric coating M3 is between 130 and 190 nm; preferably, To3 is between 140 and 180 nm, more preferably is between 150 and 175 nm.
  The optical thickness To4 of the dielectric coating M4 is between 60 and 110 nm; preferably, To4 is between 70 and 90 nm.
  The ratio of the thickness of the first functional layer Ag1 to the thickness of the second functional layer Ag2 is greater than 1.3.
  The ratio of the thickness of the third functional layer Ag3 to the thickness of the second functional layer Ag2 is greater than 1.3.
  The thickness of the third functional layer Ag3 is greater than the thickness of the first functional layer Ag1. In such a configuration, the ratio of the thickness of the first functional layer Ag3 to the thickness of the second functional layer Ag1 is advantageously greater than 1.1, more preferably greater than 1.2, or even greater than 1.3.
  The stack additionally comprises at least one blocking layer located in contact with a functional metal layer, and preferably each functional layer is in contact with a blocking layer located above it.

The stack comprises, starting from the transparent substrate:
a first dielectric coating M1 preferably comprising at least one dielectric layer having a barrier function and one dielectric layer having a stabilizing function,
optionally a blocking layer,
a first functional layer Ag1,
optionally a blocking layer,
a second dielectric coating M2 preferably comprising at least one lower dielectric layer having a stabilizing function, one dielectric layer having a barrier function and one upper dielectric layer having a stabilizing function,
optionally a blocking layer,
a second functional layer Ag2,
optionally a blocking layer,
a third dielectric coating M3 preferably comprising at least one lower dielectric layer having a stabilizing function, one dielectric layer having a barrier function and one upper dielectric layer having a stabilizing function,
optionally a blocking layer,
a third functional layer Ag3,
optionally a blocking layer,
a fourth dielectric coating M4 preferably comprising at least one dielectric layer having a stabilizing function, one dielectric layer having a barrier function and optionally one protective layer.

The invention additionally relates to a glazing comprising at least one material as described above. Such a glazing can be in the form of a monolithic, laminated or multiple glazing.

All the light characteristics presented in the description are obtained according to the principles and methods described in the European standard EN 410 relating to the determination of the light and solar characteristics of the glazings used in the glass for the construction industry.

Conventionally, the refractive indices are measured at a wavelength of 550 nm. The light transmission $T_L$ and light reflection $R_L$ factors are measured under the illuminant D65 with a field of vision of 2°.

Unless otherwise indicated, all the values and ranges of values for the optical and thermal characteristics are given for a double glazing consisting of clear substrates of ordinary soda-lime glass type, including a first 6-mm substrate, carrying the stack of thin layers, of a 16-mm interlayer space filled with argon in a proportion of 90% and with air in a proportion of 10%, and of another uncoated substrate, which is also clear, of soda-lime glass type with a thickness of 4 mm. The first coated substrate is placed in the double glazing so that the stack of thin layers is found on face 2 of said glazing. The external light reflection $R_{Lext}$ of the double glazing is measured on the side of the first substrate, while the reflection $R_{Lint}$ of the double glazing is measured on the side of the second substrate (not comprising a stack).

Unless otherwise mentioned, the thicknesses touched on in the present document, without any further information, are physical, or else real or geometrical, thicknesses denoted Tp and are expressed in nanometers. In contrast, an optical thickness To of a layer or of an assembly of layers is defined as the physical thickness of the layer under consideration multiplied by its refractive index (n) at the wavelength of 550 nm: $To = n_{550} \times Tp$. As the refractive index is a dimensionless value, it may be considered that the unit of the optical thickness is the same as that chosen for the physical thickness. In the present description, the unit chosen for the thicknesses is the nanometer, unless otherwise indicated. If a dielectric coating is composed of several dielectric layers, the optical thickness of the dielectric coating corresponds to the sum of the optical thicknesses of the different dielectric layers constituting the dielectric coating.

Throughout the description, the substrate according to the invention is regarded as being positioned horizontally. The stack of thin layers is deposited above and in contact with the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or more) layer(s) inserted between these two layers (or layer and coating).

Within the meaning of the present invention, the labels "first", "second", "third" and "fourth" for the functional layers or the dielectric coatings are defined starting from the substrate carrying the stack and with reference to the layers or coatings having the same function. For example, the functional layer closest to the substrate is the first functional layer, the next moving away from the substrate is the second functional layer, and so on.

As indicated above, the invention also relates to a glazing comprising a material according to the invention. Conventionally, the faces of a glazing are denoted from the outside of the building and by numbering the faces of the substrates from the outside toward the inside of the passenger compartment or premises equipped with it. This means that the incident sunlight passes through the faces in increasing numerical order thereof.

The stack is preferably positioned in the glazing so that the incident light originating from the outside passes through the first dielectric coating before passing through the first functional metal layer. The stack is not deposited on the face of the substrate defining the exterior wall of the glazing but on the interior face of this substrate. The stack is thus advantageously positioned on face 2, the face 1 of the glazing being the outermost face of the glazing, as usual.

By choosing to fit the glazing in this way, the first dielectric coating (M1) is located between the outside and all the silver-based functional layers of the stack.

Preferably, the stack is deposited by magnetic-field-assisted cathode sputtering (magnetron process). According to this advantageous embodiment, all the layers of the stack are deposited by magnetic-field-assisted cathode sputtering.

The invention also relates to the process for obtaining a material according to the invention, in which the layers of the stack are deposited by magnetron cathode sputtering.

The silver-based functional metal layers comprise at least 95.0%, preferably at least 96.5% and better still at least 98.0% by weight of silver, with respect to the weight of the functional layer. The silver-based metal functional layer preferably comprises less than 1.0% by weight of metals other than silver, with respect to the weight of the silver-based metal functional layer.

The stack can additionally comprise at least one upper protective layer, in particular based on TiZr (ou TiZrO).

Blocking layers can be present in the stack according to the invention. They conventionally have the role of protecting the functional layers from possible damage during the deposition of the upper antireflective coating and/or during a possible high-temperature heat treatment of the annealing, bending and/or tempering type.

The blocking layers are chosen, for example, from metal layers based on a metal or on a metal alloy, metal nitride layers, metal oxide layers and metal oxynitride layers of one or more elements chosen from titanium, nickel, chromium and niobium, such as Ti, TiN, $TiO_x$, Nb, NbN, Ni, NiN, Cr, CrN, NiCr or NiCrN or else $NbNO_x$ or $NiCrO_x$.

The geometrical thickness of such layers is of the order of a few nanometers, generally less than 7 nanometers and most often approximately a nanometer or even less than a nanometer.

When these blocking layers are deposited in the metal, nitride or oxynitride form, these layers can undergo a partial or complete oxidation according to their thickness and the nature of the layers which frame them, for example, during the deposition of the following layer or by oxidation in contact with the underlying layer.

According to advantageous embodiments of the invention, the blocking layer or layers satisfy one or more of the following conditions:
- each functional metal layer is in contact with at least one blocking layer chosen from a blocking underlayer and a blocking overlayer, and/or
- the thickness of each blocking layer is at least 0.1 nm, preferably between 0.1 and 1.0 nm, and/or
- the total thickness of all the blocking layers in contact with the functional layers is between 0.1 and 2 nm, including these values, preferably between 0.3 and 1.5 nm, indeed even 0.5 and 1.0 nm.

According to advantageous embodiments of the invention, the dielectric coatings satisfy one or more of the following conditions:
- the dielectric coatings comprise at least one dielectric layer based on an oxide or on a nitride of one or more elements chosen from silicon, titanium, zirconium, aluminum, tin or zinc, and/or
- at least one dielectric coating comprises at least one dielectric layer having a barrier function, and/or
- each of the dielectric coatings comprises at least one dielectric layer having a barrier function, and/or
- the dielectric layers having a barrier function are based on compounds of silicon and/or of aluminum chosen from oxides, such as $SiO_2$ and $Al_2O_3$ or their mixture, silicon nitrides $Si_3N_4$ and AlN or their mixture, and oxynitrides $SiO_xN_y$ and $AlO_xN_y$ or their mixture, and/or
- the dielectric layers having a barrier function are based on compounds of silicon and/or of aluminum optionally comprise at least one other element, such as aluminum, hafnium and zirconium, and/or
- at least one dielectric coating comprises at least one dielectric layer having a stabilizing function, and/or
- each dielectric coating comprises at least one dielectric layer having a stabilizing function, and/or
- the dielectric layers having a stabilizing function are preferably based on an oxide chosen from zinc oxide, tin oxide, zirconium oxide or a mixture of at least two of them,
- the dielectric layers having a stabilizing function are preferably based on crystalline oxide, in particular based on zinc oxide, optionally doped using at least one other element, such as aluminum, and/or
- each functional layer is above a dielectric coating, the upper layer of which is a dielectric layer having a stabilizing function, preferably based on zinc oxide, and/or below a dielectric coating, the lower layer of which is a dielectric layer having a stabilizing function, preferably based on zinc oxide.

Preferably, each dielectric coating consists solely of one or more dielectric layers. Preferably, there is thus no absorbing layer in the dielectric coatings, in order not to reduce the light transmission.

The stacks of the invention can comprise dielectric layers having a barrier function. The term "dielectric layers having a barrier function" is understood to mean a layer made of a material capable of forming a barrier to the diffusion of water and oxygen at high temperature, originating from the ambient atmosphere or from the transparent substrate, toward the functional layer. The constituent materials of the dielectric layer having a barrier function thus must not undergo chemical or structural modification at high temperature which would result in a modification of their optical properties. The layer or layers having a barrier function are preferably also chosen such that they are made of a material capable of forming a barrier to the constituent material of the functional layer. The dielectric layers having a barrier function thus make it possible for the stack to undergo, without excessively great optical change, heat treatments of the annealing, tempering or bending type.

The stacks of the invention can comprise dielectric layers having a stabilizing function. Within the meaning of the invention, "stabilizing" means that the nature of the layer is selected so as to stabilize the interface between the functional layer and this layer. This stabilization results in the strengthening of the adhesion of the functional layer to the layers which frame it and, in fact, it will oppose the migration of its constituent material.

The dielectric layer or layers having a stabilizing function can be found directly in contact with a functional layer or separated by a blocking layer.

Preferably, the final dielectric layer of each dielectric coating located below a functional layer is a dielectric layer having a stabilizing function. This is because it is advantageous to have a layer having a stabilizing function, for example based on zinc oxide, below a functional layer as it facilitates the adhesion and the crystallization of the silver-based functional layer and increases its quality and its stability at high temperature.

It is also advantageous to have a layer having a stabilizing function, for example based on zinc oxide, above a functional layer in order to increase the adhesion thereof and to optimally oppose the diffusion on the side of the stack opposite the substrate.

The dielectric layer or layers having a stabilizing function can thus be found above and/or below at least one functional layer or each functional layer, either directly in contact therewith or separated by a blocking layer.

Advantageously, each dielectric layer having a barrier function is separated from a functional layer by at least one dielectric layer having a stabilizing function.

This dielectric layer having a stabilizing function can have a thickness of at least 4 nm, in particular a thickness of between 4 and 10 nm and better still of 8 to 10 nm.

The stack of thin layers can optionally comprise a protective layer. The protective layer is preferably the final layer of the stack, that is to say the layer furthest from the substrate coated with the stack. These upper protective layers are regarded as included in the fourth dielectric coating. These layers generally have a thickness of between 2 and 10 nm, preferably 2 and 5 nm. This protective layer can be chosen from a layer of titanium, of zirconium, of hafnium, of zinc and/or of tin, this or these metals being in the metal, oxide, nitride or oxynitride form.

The protective layer can, for example, be chosen from a layer of titanium oxide, a layer of tin zinc oxide or a layer of titanium zirconium oxide.

A particularly advantageous embodiment relates to a substrate coated with a stack, defined starting from the transparent substrate, comprising:
- a first dielectric coating preferably comprising at least one dielectric layer having a barrier function and one dielectric layer having a stabilizing function,
- optionally a blocking layer,
- a first functional layer,
- optionally a blocking layer,
- a second dielectric coating preferably comprising at least one lower dielectric layer having a stabilizing function, one dielectric layer having a barrier function and one upper dielectric layer having a stabilizing function,
- optionally a blocking layer,
- a second functional layer,
- optionally a blocking layer,
- a third dielectric coating preferably comprising at least one lower dielectric layer having a stabilizing function, one dielectric layer having a barrier function and one upper dielectric layer having a stabilizing function,
- optionally a blocking layer,
- a third functional layer,
- optionally a blocking layer,
- a fourth dielectric coating preferably comprising at least one dielectric layer having a stabilizing function and one dielectric layer having a barrier function and optionally one protective layer.

According to other possible and advantageous embodiments of the present invention:
- Each dielectric coating below a functional layer comprises a final stabilizing layer based on crystalline zinc oxide, which is in contact with the functional layer deposited immediately above.
- Each dielectric coating above a functional layer comprises a first stabilizing layer based on crystalline zinc oxide, which is in contact with the functional layer deposited immediately above.
- Each dielectric coating comprises a dielectric layer having a barrier function based on silicon nitride, doped with aluminum, referred to here as $Si_3N_4$.
- Each functional metal layer is below and in contact with a blocking layer.
- The stack additionally comprises a protective layer made of TiZr or of titanium zirconium oxide with a thickness of less than 5 nanometers.

The transparent substrates according to the invention are preferably made of a rigid inorganic material, such as made of glass, or are organic, based on polymers (or made of polymer).

The transparent organic substrates according to the invention, which are rigid or flexible, can also be made of polymer. Examples of polymers suitable according to the invention comprise in particular:
- polyethylene;
- polyesters, such as polyethylene terephthalate (PET), polybutylene terephthalate (PBT) or polyethylene naphthalate (PEN);
- polyacrylates, such as polymethyl methacrylate (PMMA);
- polycarbonates;
- polyurethanes;
- polyamides;
- polyimides;
- fluoropolymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);
- photocrosslinkable and/or photopolymerizable resins, such as thiolene, polyurethane, urethane-acrylate or polyester-acrylate resins; and
- polythiourethanes.

The substrate is preferably a sheet of glass or of glass-ceramic.

The substrate is preferably transparent, colorless (it is then a clear or extra-clear glass) or colored, for example blue, gray or bronze. The glass is preferably of soda-lime-silica type but it can also be a glass of borosilicate or alumino-borosilicate type.

The substrate advantageously has at least one dimension greater than or equal to 1 m, indeed even 2 m and even 3 m. The thickness of the substrate generally varies between 0.5 mm and 19 mm, preferably between 0.7 and 9 mm, in particular between 2 and 8 mm, indeed even between 4 and 6 mm. The substrate can be flat or bent, indeed even flexible.

The material, that is to say the substrate coated with the stack, can undergo a high-temperature heat treatment, such as an annealing, for example by a flash annealing, such as a laser or flame annealing, a tempering and/or a bending. The temperature of the heat treatment is greater than 400° C., preferably greater than 450° C. and better still greater than 500° C. The substrate coated with the stack can thus be bent and/or tempered.

The glazing of the invention can be in the form of a monolithic, laminated or multiple glazing, in particular a double glazing or a triple glazing.

In the case of a monolithic or multiple glazing, the stack is preferably deposited on face 2, that is to say that it is found on the substrate defining the exterior wall of the glazing and more specifically on the interior face of this substrate.

A monolithic glazing comprises 2 faces; the face 1 is outside the building and thus constitutes the exterior wall of the glazing and the face 2 is inside the building and thus constitutes the interior wall of the glazing.

A multiple glazing comprises at least two substrates held at a distance so as to delimit a cavity filled with an insulating gas. The materials according to the invention are very particularly suitable when they are used in double glazings having enhanced thermal insulation (ETI).

A double glazing comprises 4 faces; the face 1 is outside the building and thus constitutes the exterior wall of the glazing and the face 4 is inside the building and thus constitutes the interior wall of the glazing, the faces 2 and 3 being inside the double glazing.

In the same way, a triple glazing comprises 6 faces; the face 1 is outside the building (exterior wall of the glazing), the face 6 is inside the building (interior wall of the glazing) and the faces 2 to 5 are inside the triple glazing.

A laminated glazing comprises at least one structure of first substrate/sheet(s)/second substrate type. The stack of thin layers is positioned on one at least of the faces of one of the substrates. The stack can be on the face of the second substrate not in contact with the sheet, preferably polymer. This embodiment is advantageous when the laminated glazing is fitted in a double glazing with a third substrate.

The glazing according to the invention, used as monolithic glazing or in a multiple glazing of double glazing type, exhibits colors in external reflection which are neutral, pleasant and subdued, within the range of the blues or blue-greens (in particular colors, the dominant wavelength of which is of the order of 450 to 500 nanometers). Furthermore, this visual appearance remains virtually unchanged whatever the angle of incidence with which the glazing is observed (normal incidence and incidence under an angle). This means that an observer does not have the impression of a significant lack of uniformity in hue or in appearance.

The term "color in the blue-green range" should be understood as meaning, within the meaning of the present invention, that, in the L*a*b* color measurement system, a* is between −10.0 and 0.0 and b* is between −10.0 and 0.0.

The glazing of the invention preferably exhibits colors in reflection on the external side in the L*a*b* color measurement system:
- a* is between −5.0 and 0.0, and
- b* is between −7.0 and 0.0.

The glazing of the invention preferably exhibits colors in transmission in the L*a*b* color measurement system with a* between −10.0 and 0.0, preferably between
  5.0 and 0.0, and a b* value which is negative or, if it is positive, approximately 0, in particular of less than 3.0.

According to advantageous embodiments, the glazing of the invention, in the form of a double glazing comprising the stack positioned on face 2, makes it possible in particular to achieve the following performance qualities:
- a solar factor g of less than or equal to 30% and
- a light transmission which is substantially greater than 50.0% (between 50.0% and 57.0%, preferably simultaneously greater than 50.0% and less than 57.0%) and
- a high selectivity of at least 1.8 (in particular a selectivity S of the order of 1.8 for a double glazing with a stack of thin layers according to the invention on face 2) and/or
- a light reflection on the external side, by increasing order of preference, of greater than or equal to 20.0%, of between 20.0% and 35.0%, of greater than or equal to 25.0%, of between 25.0% and 35.0%, of greater than or equal to 26%, of between 26.0% and 35.0%, indeed even of the order of 30.0%, of between 30.0% and 35.0%.

The details and advantageous characteristics of the invention emerge from the following nonlimiting examples, illustrated by means of the appended FIGURE.

The proportions between the various components are not observed in order to make the FIGURE easier to read.

Figure 1:
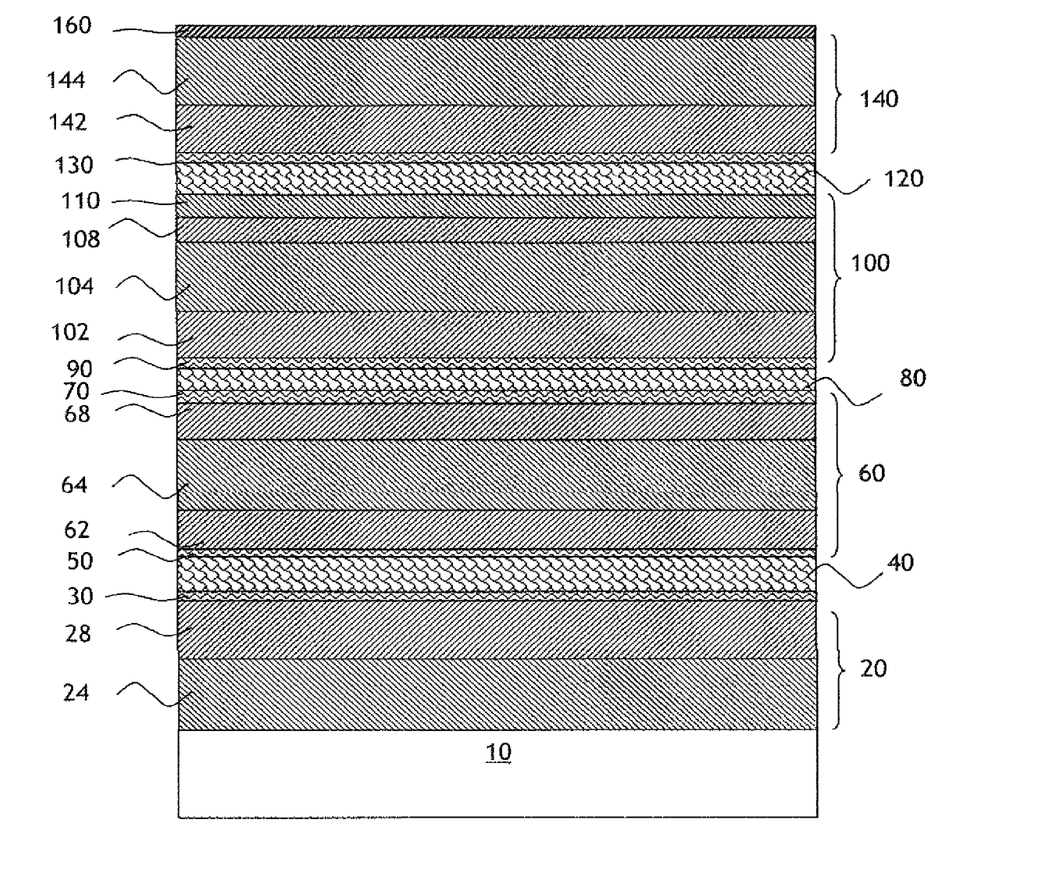

FIG. 1 illustrates a stack structure according to the invention comprising three functional metal layers 40, 80, 120, this structure being deposited on a transparent glass substrate 10. Each functional layer 40, 80, 120 is positioned between two dielectric coatings 20, 60, 100, 140 so that:
- the first functional layer 40 starting from the substrate is positioned between the dielectric coatings 20, 60,
- the second functional layer 80 is positioned between the dielectric coatings 60, 100 and
- the third functional layer 120 is positioned between the dielectric coatings 100, 140.

These dielectric coatings 20, 60, 100, 140 each comprise at least one dielectric layer 24, 28; 62, 64, 68; 102, 104, 108; 142, 144.

The stack can also comprise:
- blocking underlayers 30, 70 located in contact with a functional layer,
- blocking overlayers 50, 90 and 130 located in contact with a functional layer,
- a protective layer 160, for example made of TiZr or of titanium zirconium oxide.

EXAMPLES

I. Preparation of the Substrates: Stacks, Deposition Conditions

Stacks of thin layers defined below are deposited on substrates made of clear soda-lime glass with a thickness of 6 mm.

In the examples of the invention:
- the functional layers are silver (Ag) layers,
- the blocking layers are metal layers made of an alloy of nickel and of chromium (NiCr),
- the barrier layers are based on silicon nitride, doped with aluminum ($Si_3N_4$:Al),
- the stabilizing layers are made of zinc oxide doped with aluminum (ZnO).

The conditions for deposition of the layers, which were deposited by sputtering ("magnetron cathode" sputtering), are summarized in table 1.

TABLE 1

| | Target employed | Deposition pressure | Gas | n at 550 nm |
|---|---|---|---|---|
| $Si_3N_4$ | Si:Al at 92:8 (% by weight) | $3.2 \times 10^{-3}$ mbar | 55% Ar/ (Ar + $N_2$) | 2.03 |
| ZnO | Zn:Al at 98:2 (% by weight) | $1.8 \times 10^{-3}$ mbar | 63% Ar/ (Ar + $O_2$) | 1.95 |
| SnZnO | Zn:68 Sn:30 Sb:2 (% by weight) | $3.7 \times 10^{-3}$ mbar | 59% Ar/ (Ar + $O_2$) | 2.04 |
| NiCr | Ni (80 at. %); Cr (20 at. %) | $2\text{-}3 \times 10^{-3}$ mbar | 100% Ar | — |
| Ag | Ag | $3 \times 10^{-3}$ mbar | 100% Ar | — |

At. = atomic

Table 2 lists the materials and the physical thicknesses in nanometers (unless otherwise indicated) of each layer and the corresponding optical thickness (in nanometers) of each dielectric coating as a function of their position with regard to the substrate carrying the stack (final line at the bottom of the table).

TABLE 2

| | Layer No. in figure 1 | Ex. 1 (inv) | Ex. 2 (inv) | Ex. 3 (comp) | Ex. 4 (comp) | Ex. 5 (comp) |
|---|---|---|---|---|---|---|
| To of the dielectric coating M4 with: | 140 | 75 | 75 | 51 | 79 | 84 |
| Tp (ZnO) | 144 | 8 | 8 | NA | NA | NA |
| Tp ($Si_3N_4$:Al) | 142 | 28.5 | 28.5 | NA | NA | NA |
| Tp (NiCr) (blocking layer) | 130 | 1 | 0.2 | — | — | 0.1 |
| Tp (Ag3) (functional layer) | 120 | 14.5 | 13.8 | 13 | 22 | 15.5 |
| To of the dielectric coating M3 with: | 100 | 169 | 153 | 100 | 125 | 170 |
| Tp (ZnO) | 110 | 8 | 8 | NA | NA | NA |
| Tp (SnZnO) | 108 | 8 | 8 | NA | NA | NA |
| Tp ($Si_3N_4$:Al) | 104 | 58 | 50 | NA | NA | NA |
| Tp (ZnO) | 102 | 8 | 8 | NA | NA | NA |
| NiCr (blocking layer) | 90 | 1.0 | 0.1 | — | — | 0.6 |
| Tp (Ag2) (functional layer) | 80 | 8.0 | 5.0 | 11 | 6.5 | 15.8 |
| Tp (NiCr) (blocking layer) | 70 | 4.0 | 0.1 | — | — | o |

TABLE 2-continued

| | Layer No. in figure 1 | Ex. 1 (inv) | Ex. 2 (inv) | Ex. 3 (comp) | Ex. 4 (comp) | Ex. 5 (comp) |
|---|---|---|---|---|---|---|
| To of the dielectric coating M2 with: | 60 | 59 | 60 | 160 | 115 | 115 |
| Tp (ZnO) | 68 | 8 | 8 | NA | NA | NA |
| Tp (Si$_3$N$_4$:Al) | 64 | 13 | 13.8 | NA | NA | NA |
| Tp (ZnO) | 62 | 8 | 8 | NA | NA | NA |
| Tp (NiCr) (blocking layer) | 50 | 1.0 | 0.1 | — | — | 0.1 |
| Tp (Ag1) (functional layer) | 40 | 10.5 | 15.8 | 14 | 8 | 7 |
| Tp (NiCr) (blocking layer) | 30 | 1.0 | 0.4 | — | — | — |
| To of the dielectric coating M1 with: | 20 | 82 | 94 | 89 | 65 | 116 |
| Tp (ZnO) | 28 | 8 | 8 | NA | NA | NA |
| Tp (Si$_3$N$_4$:Al) | 24 | 32 | 37.8 | NA | NA | NA |
| Glass substrate (mm) | 10 | 6 | 6 | 6 | 6 | 6 |

*Tp: Physical thickness (nm);
To: Optical thickness (nm).

Examples 1 and 2 are examples according to the invention. Comparative examples 3 and 4 are examples as described in the international patent application No. WO2011/147875. Comparative example 5 is in accordance with example 1 of the international patent application No. WO2017/006030.

II. "Solar Control" and Colorimetry Performance Qualities

Table 3 lists the main optical characteristics measured when the stacks form part of a double glazing of 6/16/4 structure: (ext.) 6-mm glass/16-mm interlayer space filled with 90% argon/4-mm glass (int.), the stack been positioned on face 2 (the face 1 of the glazing being the outermost face of the glazing, as usual).

For these double glazings:

$T_L$ indicates: the light transmission in the visible region in %, measured according to the illuminant D65 at 2° Observer;

$a^*_T$ and $b^*_T$ indicate the colors in transmission a* and b* in the L*a*b* system, measured according to the illuminant D65 at 2° Observer and measured perpendicularly to the glazing;

$R_{Lext}$ indicates: the light reflection in the visible region in %, measured according to the illuminant D65 at 2° Observer on the side of the outermost face, the face 1;

$a^*_{Rext}$ and $b^*_{Rext}$ indicate the colors in reflection a* and b* in the L*a*b* system, measured according to the illuminant D65 at 2° Observer on the side of the outermost face and measured thus perpendicularly to the glazing;

$R_{Lint}$ indicates: the light reflection in the visible region in %, measured according to the illuminant D65 at 2° Observer on the side of the interior face, the face 4;

$a^*_{Rint}$ and $b^*_{Rint}$ indicate the colors in reflection a* and b* in the L*a*b* system, measured according to the illuminant D65 at 2° Observer on the side of the interior face and measured thus perpendicularly to the glazing.

TABLE 3

| | Target value | Ex. 1 (inv) | Ex. 2 (inv) | Ex. 3 (comp) | Ex. 4 (comp) | Ex. 5 (comp) |
|---|---|---|---|---|---|---|
| Solar factors "g" | ≤30% | 30% | 29% | 30% | 28% | 25% |
| Selectivity "s" | ≈2% | 1.8 | 1.8 | 2.0 | 2.0 | 2.0 |
| $T_L$ % | >50.0% | 53.2 | 55.5 | 59.8 | 54.8 | 50.0 |
| $a^*_T$ | <0 | −4.0 | −4.4 | −5.3 | −7.5 | −5 |
| $b^*_T$ | <3 | 1 | 2.7 | 2.9 | 3.8 | 4.5 |
| $R_{Lext}$ % | >25 | 30 | 26 | 13 | 18 | 30 |
| $a^*_{Rext}$ | <0 | −0.8 | −3.5 | −4.8 | −3 | −1 |
| $b^*_{Rext}$ | <0 | −1.5 | −6.7 | −10.1 | −7.3 | −4 |
| $R_{Lint}$ % | — | 27.5 | 22.2 | 15.8 | 21.5 | 26 |
| $a^*_{Rint}$ | <0 | −6.0 | −9.7 | −0.6 | 7.7 | −4 |
| $b^*_{Rint}$ | <0 | −0.9 | −10.3 | 1.1 | −3.3 | −6.4 |

According to the invention, it is possible to produce a glazing comprising a stack having three functional metal layers with exhibits a shiny silver appearance in reflection on the external side, a light transmission of greater than 50%, a high selectivity, a high light reflection and a low solar factor.

The examples according to the invention all exhibit a pleasant and subdued coloration in transmission, preferably within the range of the blues or blue-greens.

It is seen, with regard to the data given in table 3, that the glazings according to the invention (examples 1 and 2) simultaneously exhibit a solar factor of less than or equal to 30% for a selectivity of slightly less than 2. In addition, these glazings exhibit an external reflection at least greater than 25%, combined with a low and negative value of the factors $a^*_{Rext}$ and $b^*_{Rext}$, making it possible to obtain the desired "shiny" effect. These glazings also have neutral colors in transmission or alternatively a slightly blue-green hue.

The invention claimed is:

1. A material comprising:
    a transparent substrate coated on one face with a stack of thin layers successively comprising, starting from said face, an alternation of three silver-based functional metal layers denoted, starting from the substrate, first, second and third functional layers respectively Ag1, Ag2 and Ag3, and of four dielectric coatings denoted, starting from the substrate, M1, M2, M3 and M4, with optical thicknesses To1, To2, To3 and To4, respectively, wherein dielectric coating M1 includes all dielectric layers arranged between the transparent substrate and the first functional layer Ag1, dielectric coating M2 includes all dielectric layers arranged between the first functional layer Ag1 and the second functional layer Ag2, dielectric coating M3 includes all dielectric layers arranged between the second functional layer Ag2 and the third functional layer Ag3, and dielectric coating M4 includes all dielectric layers arranged above the third functional layer Ag3, and wherein
    a geometrical thickness of the second functional layer Ag2 is 5 to 10 nm and is less than a geometrical thickness of the first functional layer Ag1, wherein the second functional layer Ag2 is continuous,
    the geometrical thickness of the second functional layer Ag2 is less than a geometrical thickness of the third functional layer Ag3,
    the dielectric coating M2 exhibits a lower optical thickness To2 than each of the optical thicknesses To1, To3 and To4, and
    no dielectric coating M1, M2, M3 and M 4 contains tin.
2. The material as claimed in claim 1, in which the optical thickness To2 of said dielectric coating M2 is between 40 and 90 nm.

3. The material as claimed in claim 1, in which the geometrical thickness of said first functional layer Ag1 is between 10 and 18 nanometers, and
the geometrical thickness of said third functional layer Ag3 is between 10 and 18 nanometers.

4. The material as claimed in claim 1, in which the cumulative geometrical thickness of said functional layers Ag1, Ag2 and Ag3 is between 25 and 50 nanometers.

5. The material as claimed in claim 1, in which said dielectric coating M3 exhibits a greater optical thickness To3 than each of the optical thicknesses To1 and To4.

6. The material as claimed in claim 1, in which To2<To4<To1<To3.

7. The material as claimed in claim 1, in which To3>1.5 To2.

8. The material as claimed in claim 1, in which To3>1.5 To4.

9. The material as claimed in claim 1, in which To3>1.5 To1.

10. The material as claimed in claim 1, in which:
To1 is between 75 and 120 nm,
To2 is between 50 and 70 nm,
To3 is between 130 and 190 nm and
To4 is between 70 and 110 nm.

11. The material as claimed in claim 1, in which the ratio of the geometrical thickness of the first functional layer Ag1 to the geometrical thickness of the second functional layer Ag2 is greater than 1.3 and/or the ratio of the geometrical thickness of the third functional layer Ag3 to the geometrical thickness of the second functional layer Ag2 is greater than 1.3.

12. The material as claimed in claim 1, in which the geometrical thickness of the third functional layer Ag3 is greater than the geometrical thickness of the first functional layer Ag1.

13. The material as claimed in claim 1, in which the stack additionally comprises at least one blocking layer located in contact with a functional metal layer.

14. A glazing comprising:
the material as claimed in claim 1.

15. The glazing as claimed in claim 14, wherein the glazing is a monolithic, laminated or multiple glazing.

16. The material as claimed in claim 1, in which the stack additionally comprises at least one blocking layer located in contact with a functional metal layer and each functional layer is in contact with a blocking layer located above the functional layer.

17. The material as claimed in claim 1, in which said stack comprises, starting from the transparent substrate:
the first dielectric coating M1 comprises at least one dielectric layer having a barrier function and one dielectric layer having a stabilizing function,
optionally a blocking layer,
the first functional layer Ag1,
optionally a blocking layer,
the second dielectric coating M2 comprises at least one lower dielectric layer having a stabilizing function, one dielectric layer having a barrier function and one upper dielectric layer having a stabilizing function,
optionally a blocking layer,
the second functional layer Ag2,
optionally a blocking layer,
the third dielectric coating M3 comprises at least one lower dielectric layer having a stabilizing function, one dielectric layer having a barrier function and one upper dielectric layer having a stabilizing function,
optionally a blocking layer,
the third functional layer Ag3,
optionally a blocking layer, and
the fourth dielectric coating M4 comprises at least one dielectric layer having a stabilizing function, one dielectric layer having a barrier function and optionally one protective layer.

18. The material as claimed in claim 1, in which one or more of dielectric coatings M1, M2 and M3 consists of optionally-doped zinc oxide.

19. The material as claimed in claim 1, in which dielectric coating M2 consists of optionally-doped zinc oxide.

20. A material comprising:
a transparent substrate coated on one face with a stack of thin layers successively comprising, starting from said face, an alternation of three silver-based functional metal layers denoted, starting from the substrate, first, second and third functional layers respectively Ag1, Ag2 and Ag3, and of four dielectric coatings denoted, starting from the substrate, M1, M2, M3 and M4, with optical thicknesses To1, To2, To3 and To4, respectively, wherein dielectric coating M1 includes all dielectric layers arranged between the transparent substrate and the first functional layer Ag1, dielectric coating M2 includes all dielectric layers arranged between the first functional layer Ag1 and the second functional layer Ag2, dielectric coating M3 includes all dielectric layers arranged between the second functional layer Ag2 and the third functional layer Ag3, and dielectric coating M4 includes all dielectric layers arranged above the third functional layer Ag3, and wherein
the dielectric coating M2 exhibits a lower optical thickness To2 than each of the optical thicknesses To1, To3 and To4,
one or more of dielectric coatings M1, M2, M3 and M 4 consists of optionally-doped zinc oxide,
a geometrical thickness of the second functional layer Ag2 is 5 to 10 nm and is less than a geometrical thickness of the first functional layer Ag1, wherein the second functional layer Ag2 is continuous,
the geometrical thickness of the second functional layer Ag2 is less than a geometrical thickness of the third functional layer Ag3,
the geometrical thickness of said first functional layer Ag1 is between 10 and 16 nanometers, and
the geometrical thickness of said third functional layer Ag3 is between 10 and 18 nanometers.

* * * * *